US012655675B2

(12) United States Patent
Mantei et al.

(10) Patent No.: US 12,655,675 B2
(45) Date of Patent: Jun. 16, 2026

(54) SLIDING SCREEN DOOR

(71) Applicant: Peak Innovations Inc., Richmond (CA)

(72) Inventors: Adam Mantei, Burnaby (CA); David Chen, Burnaby (CA); Craig Lawson, Burnaby (CA)

(73) Assignee: PEAK INNOVATIONS INC., Richmond (CA)

( * ) Notice: Subject to any disclaimer, the term of this patent is extended or adjusted under 35 U.S.C. 154(b) by 264 days.

(21) Appl. No.: 18/270,466

(22) PCT Filed: Jan. 15, 2021

(86) PCT No.: PCT/CA2021/050039
§ 371 (c)(1),
(2) Date: Jun. 29, 2023

(87) PCT Pub. No.: WO2022/150902
PCT Pub. Date: Jul. 21, 2022

(65) Prior Publication Data
US 2024/0060355 A1 Feb. 22, 2024

(51) Int. Cl.
*E06B 3/46* (2006.01)
*E06B 3/964* (2006.01)
(Continued)

(52) U.S. Cl.
CPC .......... *E06B 3/4636* (2013.01); *E06B 3/9642* (2013.01); *E06B 9/52* (2013.01); *E06B 2003/7074* (2013.01)

(58) Field of Classification Search
CPC ........ E06B 3/4636; E06B 3/9642; E06B 3/42; E06B 3/46; E06B 3/96; E06B 9/52; E06B 9/522; E06B 2009/527
See application file for complete search history.

(56) References Cited

U.S. PATENT DOCUMENTS 3,526,995 A * 9/1970 Saunders ............ E05D 15/0669 49/420
3,729,868 A * 5/1973 Burum ................ E05D 15/0669 160/381
(Continued)

FOREIGN PATENT DOCUMENTS

CA 2217933 A1 4/1998
CA 2631282 A1 11/2009

OTHER PUBLICATIONS

International Search Report for PCT/CA2021/050039, dated Oct. 8, 2021.
Written Opinion for PCT/CA2021/050039, dated Oct. 8, 2021.

*Primary Examiner* — Johnnie A. Shablack
*Assistant Examiner* — Matthew R. Shepherd
(74) *Attorney, Agent, or Firm* — Oyen Wiggs Green & Mutala LLP

(57) ABSTRACT

A corner member for a screen door comprises opposed inner and outer surfaces and first and second connectors extending between the inner and outer surfaces. The corner member further comprises a first protrusion extending from the first connector and a second protrusion extending from the second connector. The corner member further comprises a wheel guide, an adjustment mechanism, and a third connector. The wheel guide extends from the second protrusion. The wheel mechanism is pivotably connected to the wheel guide. The adjustment mechanism adjustably pivots the wheel mechanism with respect to the wheel guide. The third connector extends between the inner and outer surfaces. The inner surface, the outer surface, the first connector, the second connector, and the third connector define, at least in part, a corner cavity. The third connector comprises an opening that provides access through the corner cavity to the adjustment mechanism.

16 Claims, 12 Drawing Sheets

(51) Int. Cl.
*E06B 9/52* (2006.01)
*E06B 3/70* (2006.01)

(56) References Cited

U.S. PATENT DOCUMENTS

| | | | | | |
|---|---|---|---|---|---|
| 3,826,044 | A * | 7/1974 | Armstrong | E05D 15/066 | 49/420 |
| 4,006,513 | A * | 2/1977 | Offterdinger | E05D 15/0669 | 49/420 |
| 4,064,592 | A * | 12/1977 | Riegelman | E05D 15/0669 | 49/425 |
| 4,189,870 | A * | 2/1980 | Helmick | E05D 15/0669 | 49/420 |
| 4,353,186 | A * | 10/1982 | Offterdinger | E05D 15/0669 | 49/420 |
| 5,960,605 | A * | 10/1999 | Hope | E06B 9/52 | 264/46.7 |
| 6,813,862 | B2 * | 11/2004 | Perich | E05D 15/0669 | 49/420 |
| 7,021,007 | B2 * | 4/2006 | Jacobs | E05D 15/0691 | 16/97 |
| 2003/0127201 | A1 * | 7/2003 | Perich | E06B 3/9647 | 160/381 |
| 2004/0211531 | A1 * | 10/2004 | Dybdahl | E06B 9/24 | 160/377 |
| 2005/0028949 | A1 * | 2/2005 | Winner | E06B 9/52 | 160/371 |
| 2005/0115178 | A1 * | 6/2005 | Schmidt | E06B 3/9641 | 52/272 |
| 2005/0230068 | A1 | 10/2005 | Green et al. | | |
| 2007/0256800 | A1 * | 11/2007 | Armstrong | E06B 9/52 | 160/371 |
| 2009/0003928 | A1 | 1/2009 | Ohrstrom | | |
| 2012/0247024 | A1 | 10/2012 | Thierrien | | |
| 2016/0265268 | A1 * | 9/2016 | Therrien | E06B 3/9682 | |
| 2024/0351406 | A1 * | 10/2024 | Takiguchi | B60J 1/20 | |

* cited by examiner

SLIDING SCREEN DOOR

FIELD OF THE INVENTION

The present invention relates to screen doors, and in particular, to screen doors that slide horizontally in order to open and/or close.

BACKGROUND OF THE INVENTION

Screen doors are commonly found in residential homes and comprise a mesh screen to block items from entering while still allowing air and light to pass through. The mesh screen is typically mounted on a frame, with the frame being able to open and close using a hinged mechanism or by sliding horizontally across the door opening. Sliding screen doors have the benefit of requiring less space than hinged screen doors, as they do not require space to accommodate the swinging out of the screen doors.

Sliding screen doors may have wheels mounted on the upper and/or lower horizontal portions of the frame to allow the frame to slide on tracks located near the upper and lower portions of the door opening. Furthermore, screen doors are intended to cover the entirety of the door opening, and it is therefore desirable that screen doors be customizable in size to accommodate door openings of different sizes.

In addition, screen doors are commonly intended to be installed by homeowners (i.e. "do-it-yourselfers"), without the need for specialized tools or equipment. As such, it is also desirable that screen doors be easy to install.

Therefore, it is desirable for a sliding screen door system that is easy to customize (to fit door openings of different sizes) and that is easy to install.

SUMMARY OF THE INVENTION

In one embodiment of the invention, a screen door system comprises upper and lower tracks, two opposed vertical members, two opposed horizontal members, four corner members, and a mesh extending between the horizontal members and the vertical members. Each of the horizontal members comprises a plurality of wheel openings. Each of the corner members comprises opposed inner and outer surfaces and first and second connectors extending between the inner and outer surfaces, with the first and second connectors substantially perpendicular to each other. The corner members further comprise a first protrusion extending from the first connector, with the first protrusion being adapted to engage with one of the vertical members, and a second protrusion extending from the second connector, with the second protrusion being adapted to engage with one of the horizontal members. The corner members further comprise a wheel guide, an adjustment mechanism, and a third connector. The wheel guide extends from the second protrusion. The wheel mechanism is pivotably connected to the wheel guide, with the wheel mechanism comprising a wheel adapted to extend, at least partially, through one of the wheel openings to engage one of the upper and lower tracks. The adjustment mechanism pivots the wheel mechanism with respect to the wheel guide to adjust an extent that the wheel extends through the wheel opening. The third connector extends between the inner and outer surfaces. The inner surface, the outer surface, the first connector, the second connector, and the third connector define, at least in part, a corner cavity. The third connector comprises an opening that provides access through the corner cavity to the adjustment mechanism.

In another embodiment, the adjustment mechanism is a screw extending from the second protrusion and engaging with the wheel mechanism In still another embodiment, rotation of the screw pivots the wheel mechanism with respect to the wheel guide.

In still yet another embodiment, the third connector is substantially parallel to the second connector.

In a further embodiment, the vertical members comprise opposed hollow vertical ends.

In yet a further embodiment, engagement of one of the corner members with one of the vertical members comprises inserting the first protrusion within one of the vertical ends.

In still yet a further embodiment, the first connector comprises one or more fastener openings for accepting fasteners.

In yet another embodiment, the vertical members comprise one or more fastener chases aligned with the fastener openings.

In a further embodiment, the corner cavity defines a corner opening, the corner opening providing access through the corner cavity to the fastener openings.

In yet a further embodiment, the first connector comprises one or more drainage openings, with the drainage openings adapted to allow liquid to exit the corner cavity.

In still yet a further embodiment, the horizontal members comprise opposed hollow horizontal ends, and engagement of one of the corner members with one of the horizontal members comprises inserting the second protrusion within one of the horizontal ends.

In another embodiment, a corner member for a screen door with horizontal and vertical members comprises opposed inner and outer surfaces and first and second connectors extending between the inner and outer surfaces, with the first and second connectors substantially perpendicular to each other. The corner member further comprises a first protrusion extending from the first connector, with the first protrusion being adapted to engage with one of the vertical members, and a second protrusion extending from the second connector, with the second protrusion being adapted to engage with one of the horizontal members. The corner member further comprises a wheel guide, an adjustment mechanism, and a third connector. The wheel guide extends from the second protrusion. The wheel mechanism is pivotably connected to the wheel guide. The adjustment mechanism adjustably pivots the wheel mechanism with respect to the wheel guide. The third connector extends between the inner and outer surfaces. The inner surface, the outer surface, the first connector, the second connector, and the third connector define, at least in part, a corner cavity. The third connector comprises an opening that provides access through the corner cavity to the adjustment mechanism.

The foregoing was intended as a summary only and of only some of the aspects of the invention. It was not intended to define the limits or requirements of the invention. Other aspects of the invention will be appreciated by reference to the detailed description of the preferred embodiments.

BRIEF DESCRIPTION OF THE DRAWINGS

The embodiments of the invention will be described by reference to the drawings thereof, in which.

DETAILED DESCRIPTION OF THE INVENTION

Figure 1:
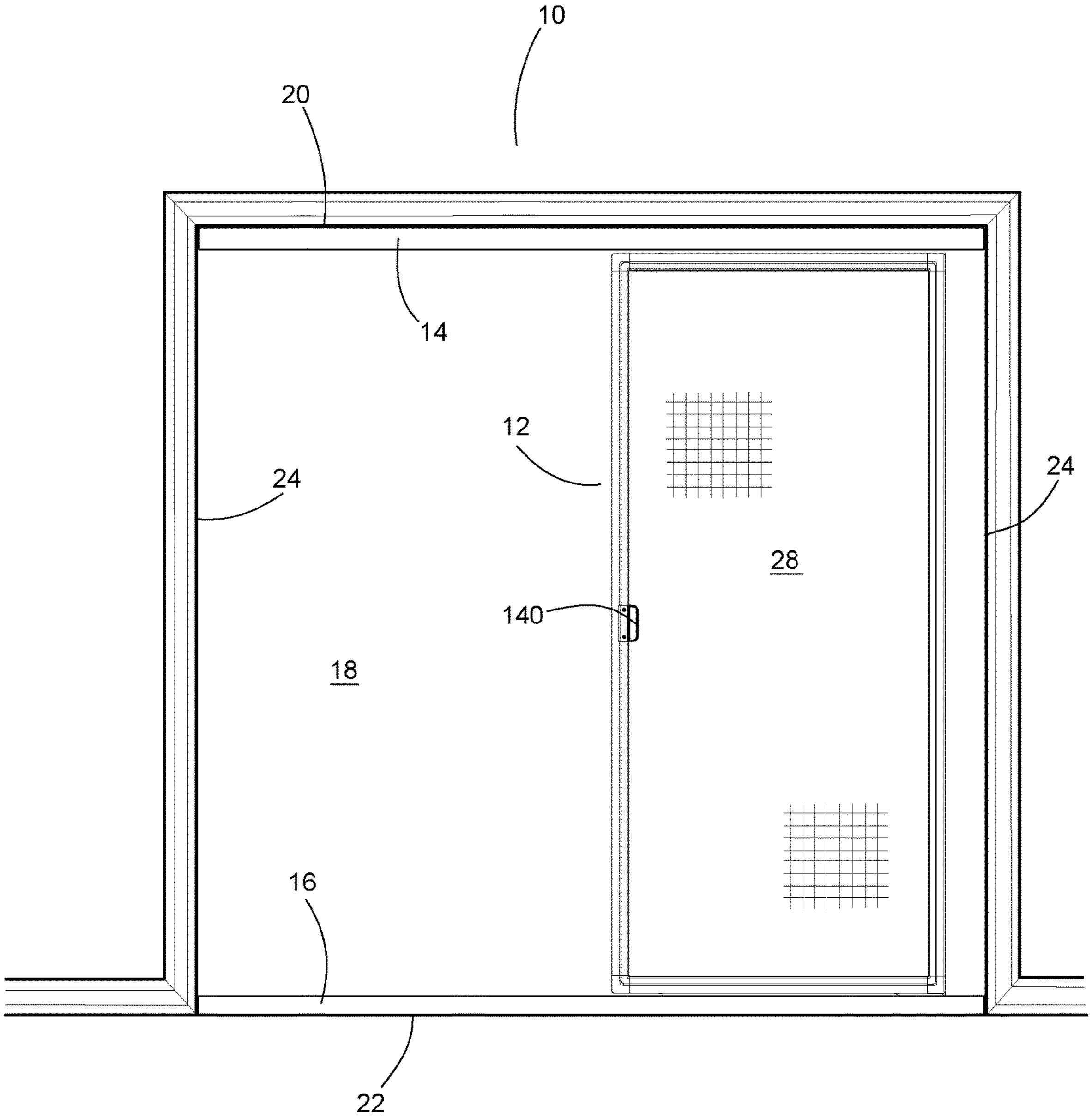
FIG. 1 shows a screen door system in accordance with the present invention.

Referring to FIG. 1, a screen door system 10 comprises a screen door 12 that is configured to travel along upper and lower tracks 14, 16. The screen door 12 is also configured to move between an "open" configuration and a "closed" configuration. When the screen door 12 is in the "closed" configuration, the screen door 12 covers substantially the entirely of a door opening 18. When the screen door 12 is in the "open" configuration, the screen door 12 covers none of the door opening 18. It is also possible for the screen door 12 to be in a configuration that is neither completely in the "closed" or "open" configuration. In other words, the screen door 12 may be in a configuration where the screen door 12 covers only a portion of the door opening 18.

The upper and lower tracks 14, 16 are preferably of sufficient length to allow the screen door 12 to move from the "closed" configuration to the "open" configuration (and configurations in between). Referring to FIG. 1, the door opening 18 may be generally rectangular, defined by a substantially horizontal opening upper edge 20, a substantially horizontal opening lower edge 22, and two substantially vertical opening side edges 24.

At least a portion of the upper track 14 is preferably located proximate to the opening upper edge 20, while at least a portion of the lower track 16 is preferably located proximate to the opening lower edge 22.

Figure 2:
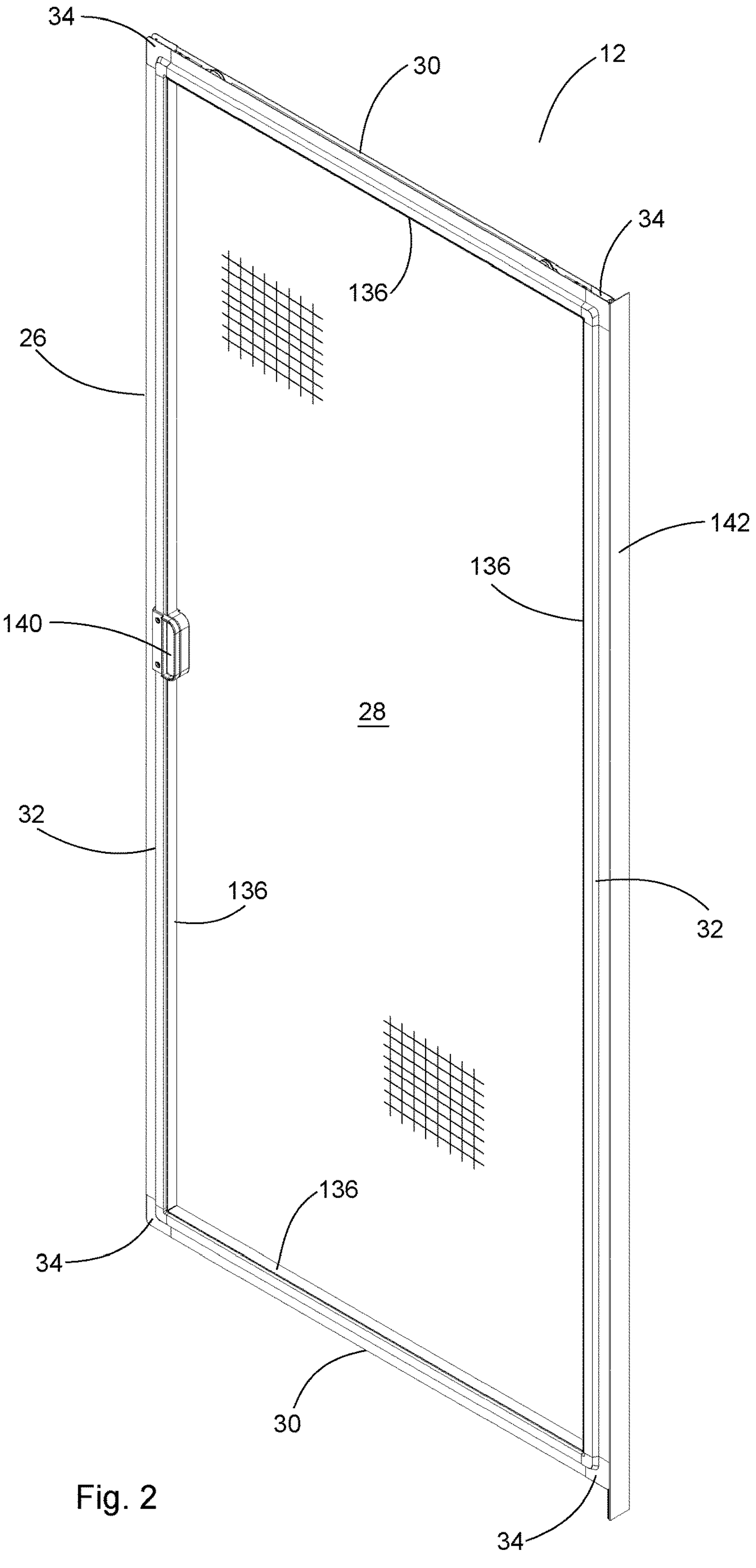
FIG. 2 shows a screen door of the screen door system of FIG. 1.

Referring to FIG. 2, the screen door 12 comprises a generally rectangular frame 26 and a mesh extending across an interior of the frame 26. The frame 26 comprises two horizontal members 30 and two vertical members 32 that are joined together by four corner members 34. Each of the corner members 34 is connected to one of the horizontal members 30 and one of the vertical members 32 in order to form the frame 26. The horizontal members 30 and the vertical members 32 are preferably made from extruded aluminum, although other materials are also possible. The corner members 34 are preferably made from cast zinc, although again other materials are also possible. Each of the vertical members 32 comprise vertical member ends 70, while each of the horizontal members 30 comprise horizontal member ends 74.

Figure 3:
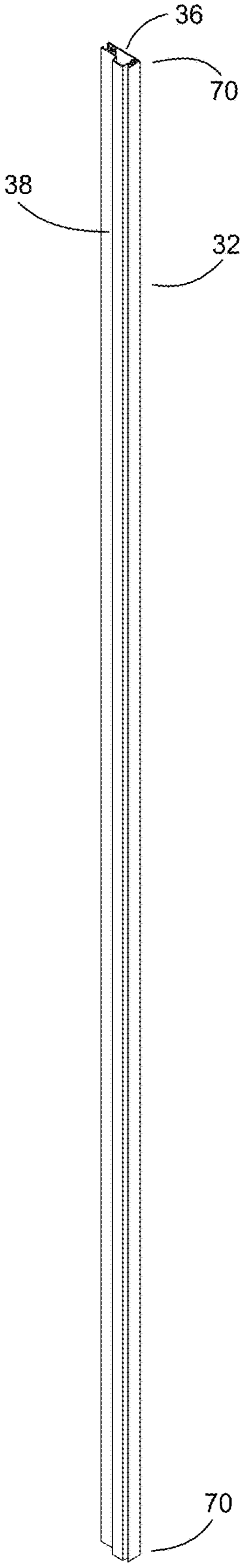
FIG. 3 shows a vertical member of the screen door system of FIG. 1.
Figure 4:
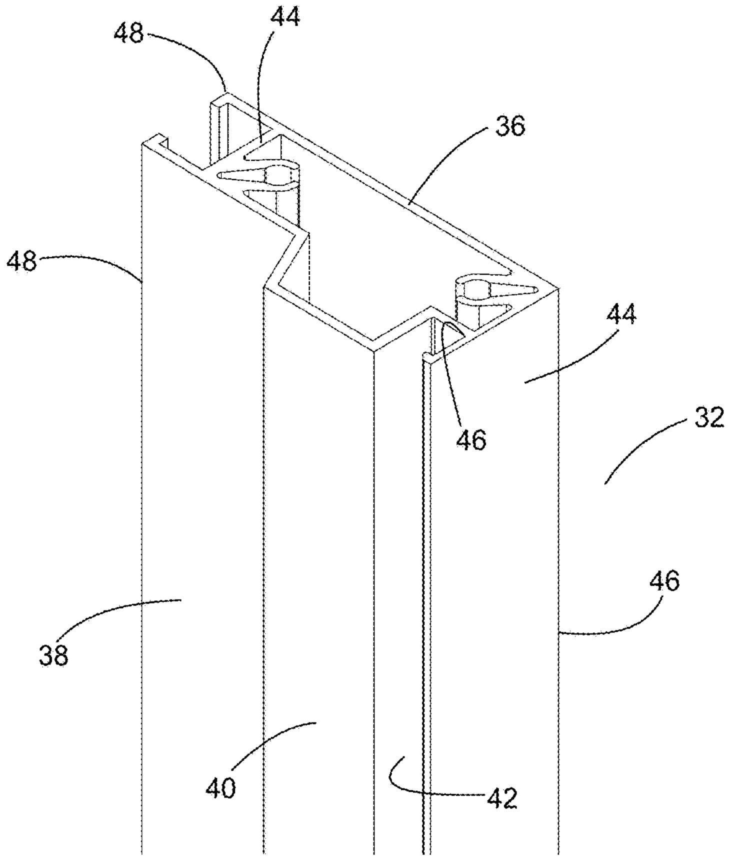
FIG. 4 is a magnified partial view of the vertical member of FIG. 3.
Figure 5:
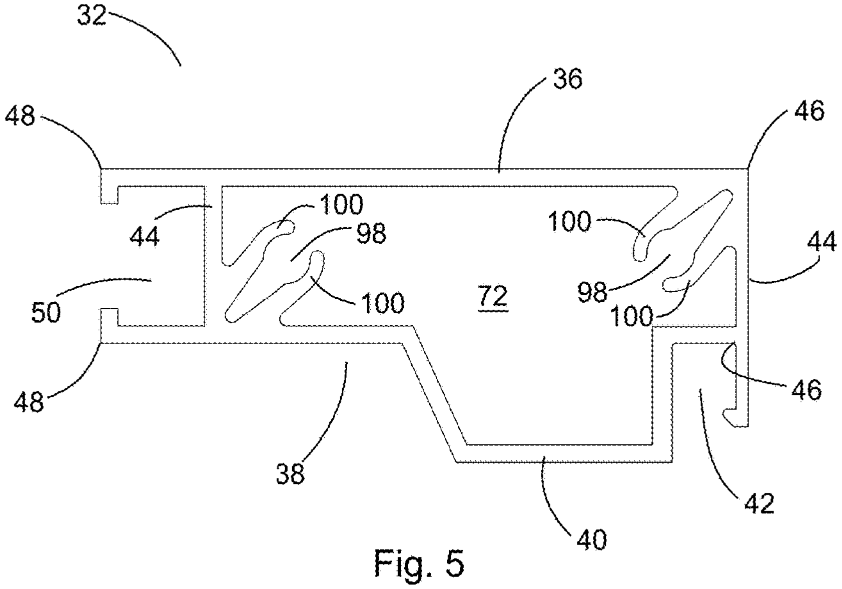
FIG. 5 is a top view of the vertical member of FIG. 3.
Figure 6:
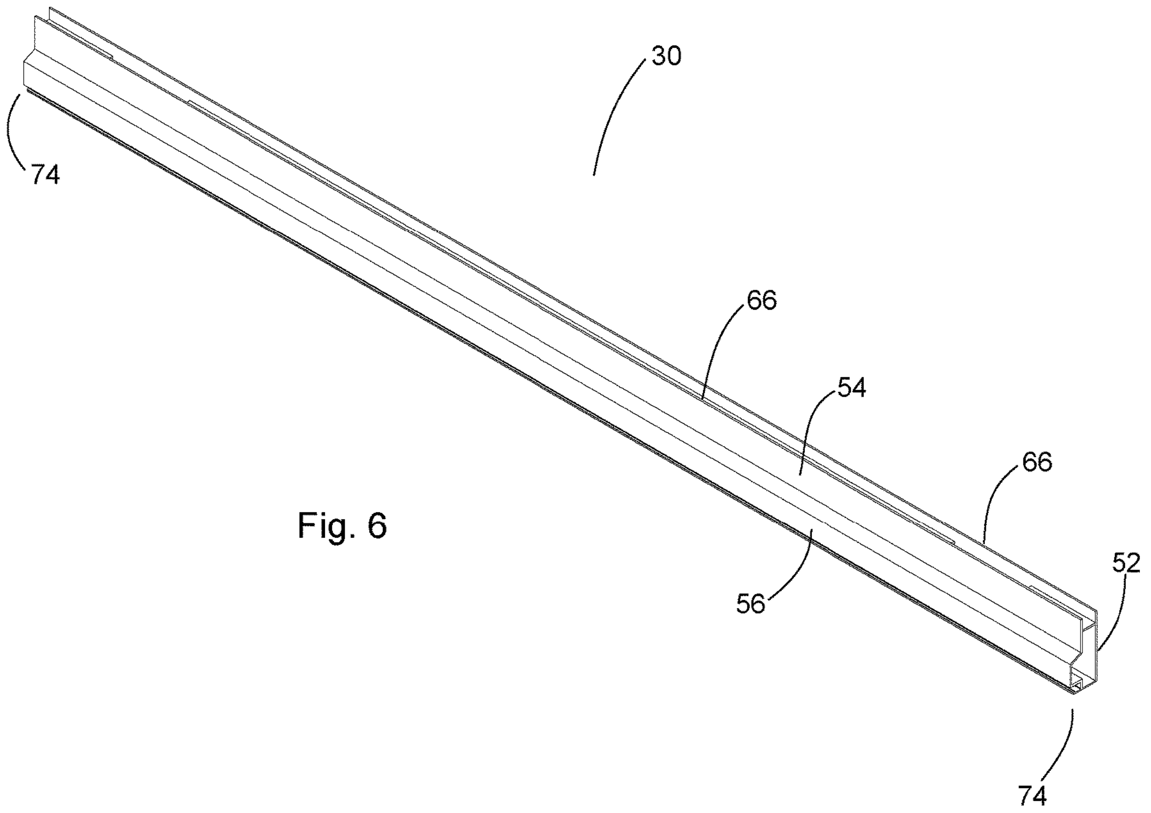
FIG. 6 shows a horizontal member of the screen door system of FIG. 1.
Figure 7:
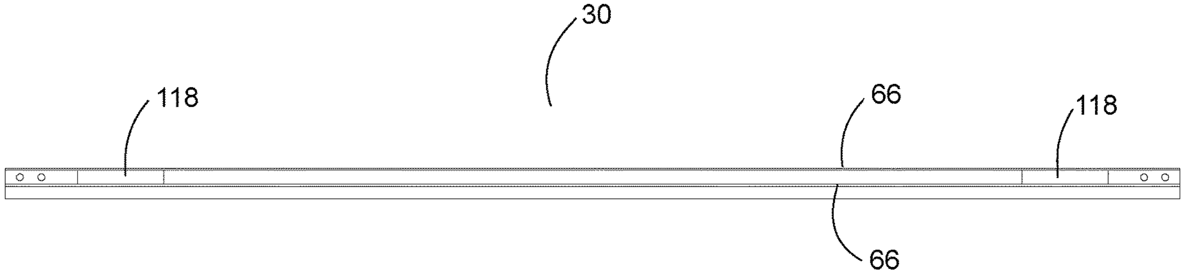
FIG. 7 is a top view of the horizontal member of FIG. 6.
Figure 8:
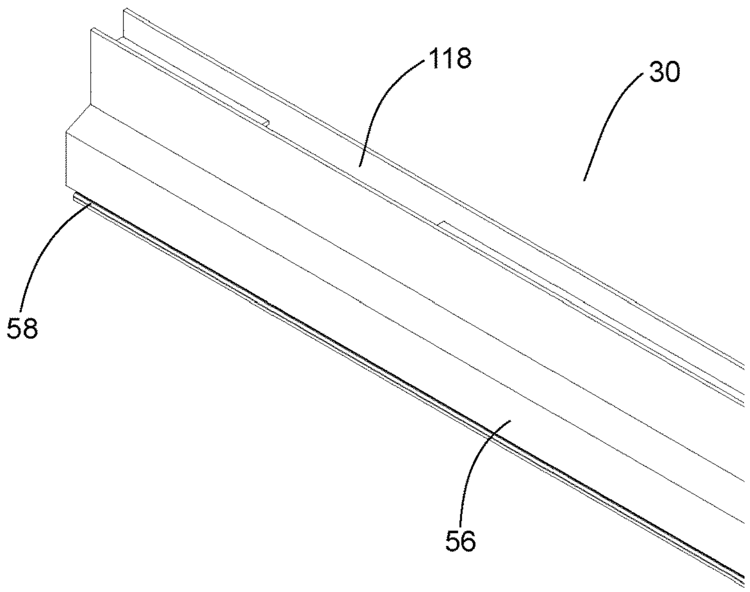
FIG. 8 is a magnified partial view of the horizontal member of FIG. 6.
Figure 9:
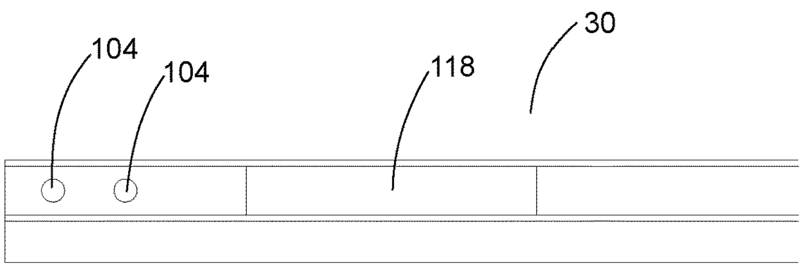
FIG. 9 is a top view of FIG. 8.

FIGS. 3 to 5 depict one of the vertical members 32. Each of the vertical members 32 comprises a vertical outer surface 36 and a vertical inner surface 38. Preferably, the vertical outer surface 36 is substantially planar. The vertical inner surface 38 preferably comprises a vertical projection 40 and a vertical groove 42 formed on the vertical projection 40. Referring to FIG. 5 specifically, which depicts a top view of one of the vertical members 32, the vertical members 32 comprise one or more vertical connectors 44 extending between the vertical outer surface 36 and the vertical inner surface 38. In the embodiment shown in FIGS. 3 to 5, two of the vertical connectors 44 are present, although in other embodiments, a different number of vertical connectors 44 may be present. Preferably, the vertical outer surface 36, the vertical inner surface 38, and the vertical connectors 44 generally define a vertical cavity 72. The vertical cavity 72 preferably extends for an entire height of the vertical member 32 but is at least present proximate to the vertical member ends 70.

Referring again to FIGS. 3 to 5, each of the vertical outer surface 36 and the vertical inner surface 38 comprises a vertical first edge 46 and a vertical second edge 48. In the embodiment shown in FIGS. 3 to 5, one of the vertical connectors 44 preferably extend proximate to the vertical first edges 46 of the vertical outer surface 36 and the vertical inner surface 38. The other one of the vertical connectors 44 preferably extend inwards of the vertical second edges 48 of the vertical outer surface 36 and the vertical inner surface 38, thereby defining a vertical channel 50 that preferably extends along an entire height of the vertical member 32.

Figure 10:
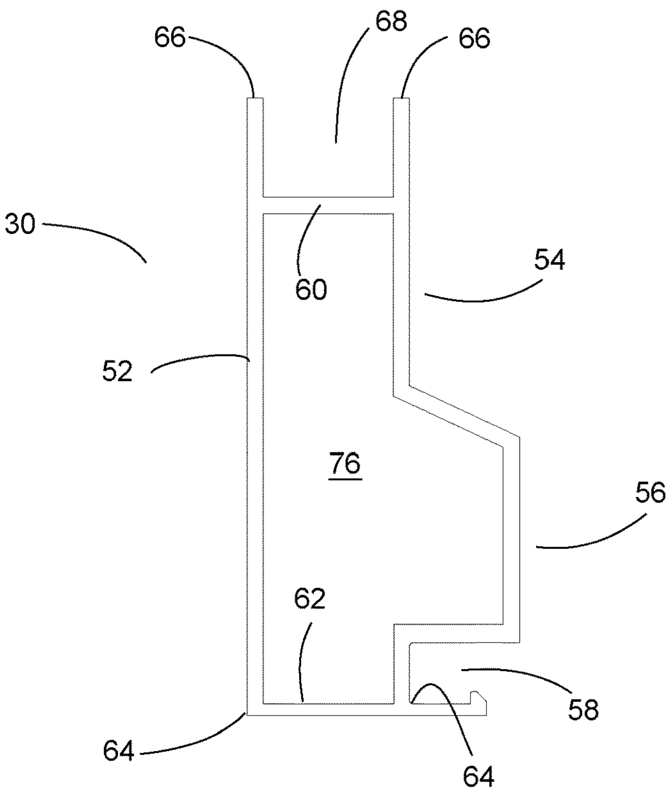
FIG. 10 is a side view of the horizontal member of FIG. 6.

FIGS. 6 to 10 depict one of the horizontal members 30. Each of the horizontal members 30 comprises a horizontal outer surface 52 and a horizontal inner surface 54. Preferably, the horizontal outer surface 52 is substantially planar. The horizontal inner surface 54 preferably comprises a horizontal projection 56 and a horizontal groove 58 formed on the horizontal projection 56. Referring specifically to FIG. 10, which depicts a side view of one of the horizontal members 30, the horizontal members 30 comprise a horizontal first connector 60 and a horizontal second connector 62 extending between the horizontal outer surface 52 and the horizontal inner surface 54. It is understood that in other embodiments, there may be additional members extending between the horizontal outer surface 52 and the horizontal lower surface 54. Preferably, the horizontal outer surface 52, the horizontal inner surface 54, the horizontal first connector 60, and the horizontal second connector 62 generally define a horizontal cavity 76. The horizontal cavity 76 preferably extends for an entire length of the horizontal member 30 but is at least present proximate to the horizontal member ends 74.

Referring again to FIGS. 6 to 10, each of the horizontal outer surface 52 and the horizontal inner surface 54 comprises a horizontal first edge 64 and a horizontal second edge 66. In the embodiment shown in FIGS. 6 to 10, the horizontal second connector 62 preferably extends proximate to the horizontal first edges of the horizontal first edges 64 of the horizontal outer surface 52 and the horizontal inner surface 54. The horizontal first connector 60 preferably extends inwards of the horizontal second edges 66 of the horizontal outer surface 52 and the horizontal inner surface 54, thereby defining a horizontal channel 68 that preferably extends along an entire length of the horizontal member 30.

Figure 11:
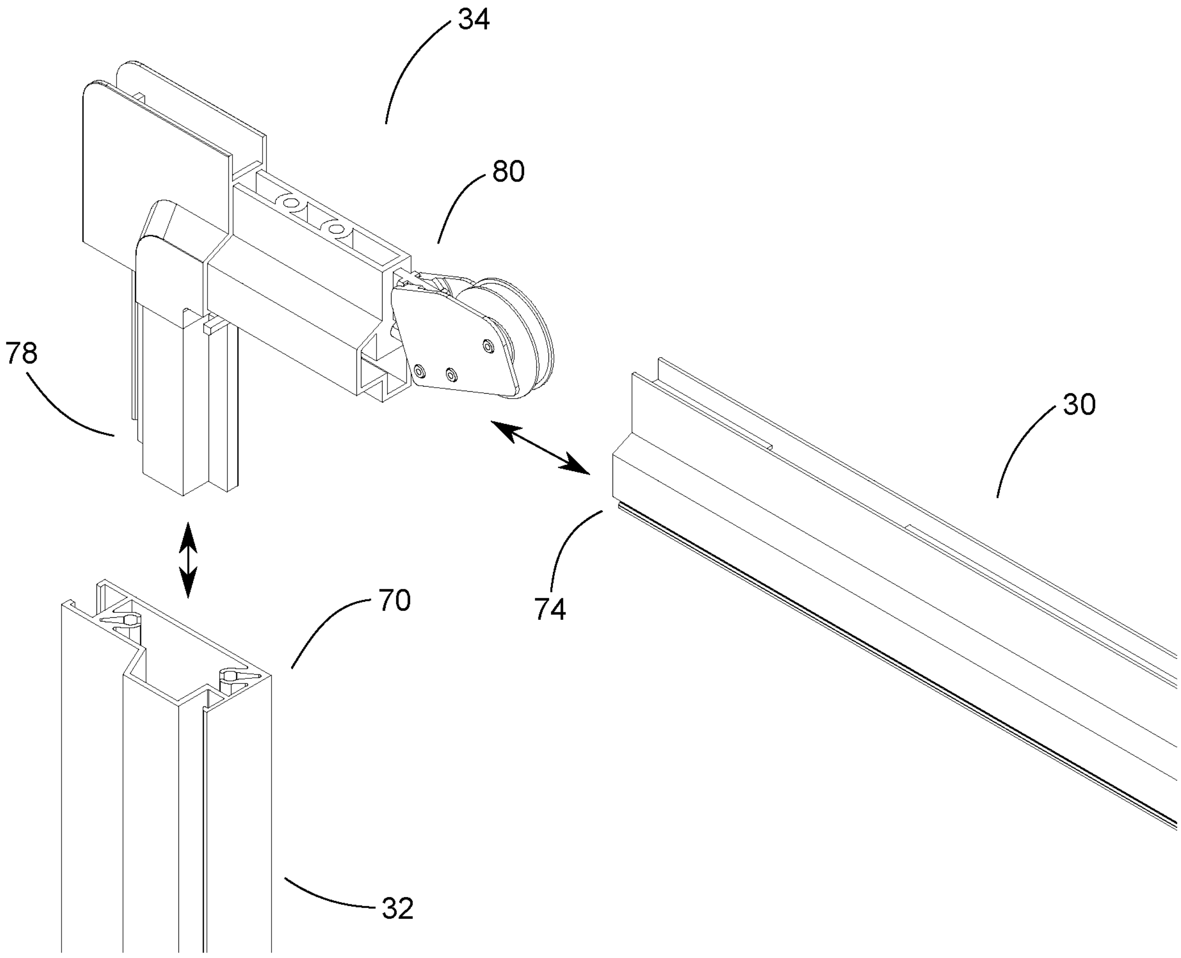
FIG. 11 is an exploded partial view showing one of the corner members, one of the horizontal members, and one of the vertical members.
Figure 12:
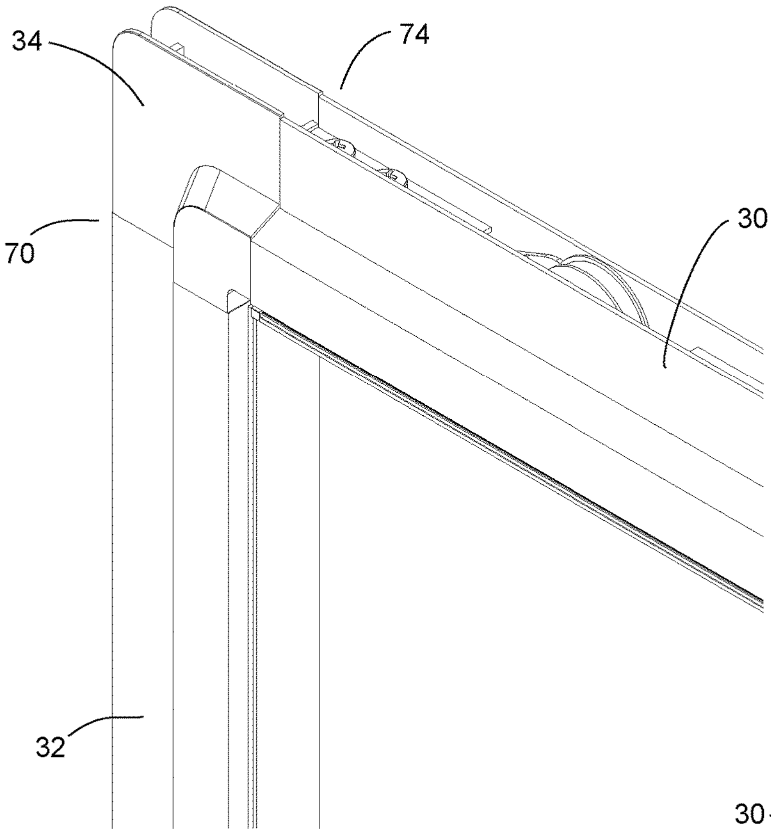
FIG. 12 is a magnified partial view showing one of the corner members connected to one of the horizontal members and one of the vertical members.
Figure 13:
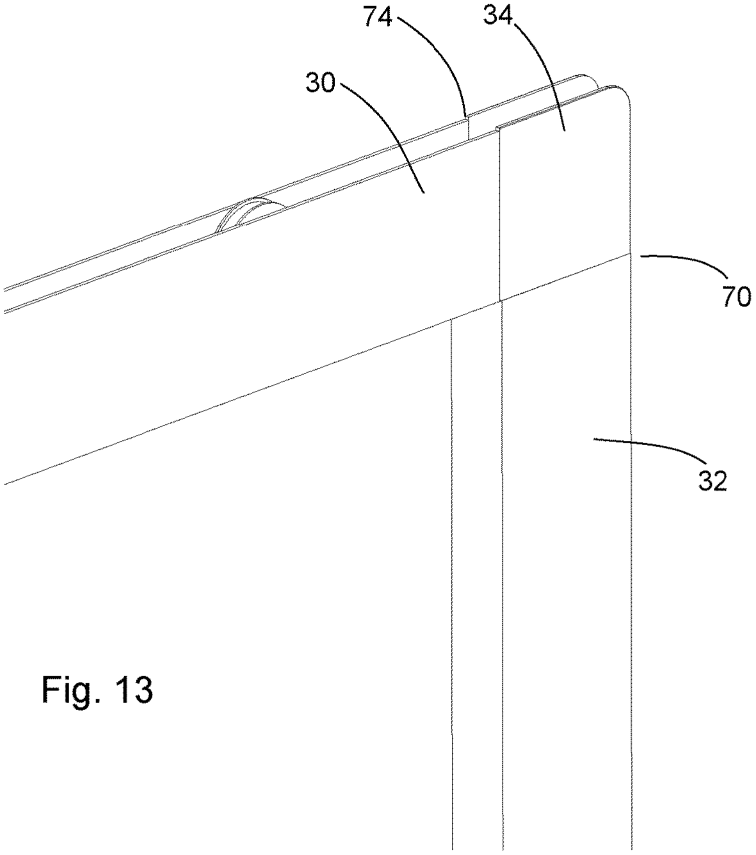
FIG. 13 is a magnified partial view showing one of the corner members connected to one of the horizontal members and one of the vertical members, viewed from another side.

FIG. 11 depicts a partial exploded view showing one of the corner members 34 with one of the horizontal members 30 and one of the vertical members 32. Each of the corner members 34 comprises corner first and second ends 78, 80. Preferably, one of the corner members 34 is adapted to connect with one of the vertical members 32 by the corner first end 78 fitting within one of the vertical member ends 70. Similarly, the corner member 34 is adapted to connect with one of the horizontal members 30 by the corner second end 80 fitting within one of the horizontal member ends 74, as shown in FIGS. 12 and 13. Although FIGS. 12 and 13 depict only one corner of the frame 26, it is understood that the connections for the other corners of the frame 26 are similar.

Figure 14:
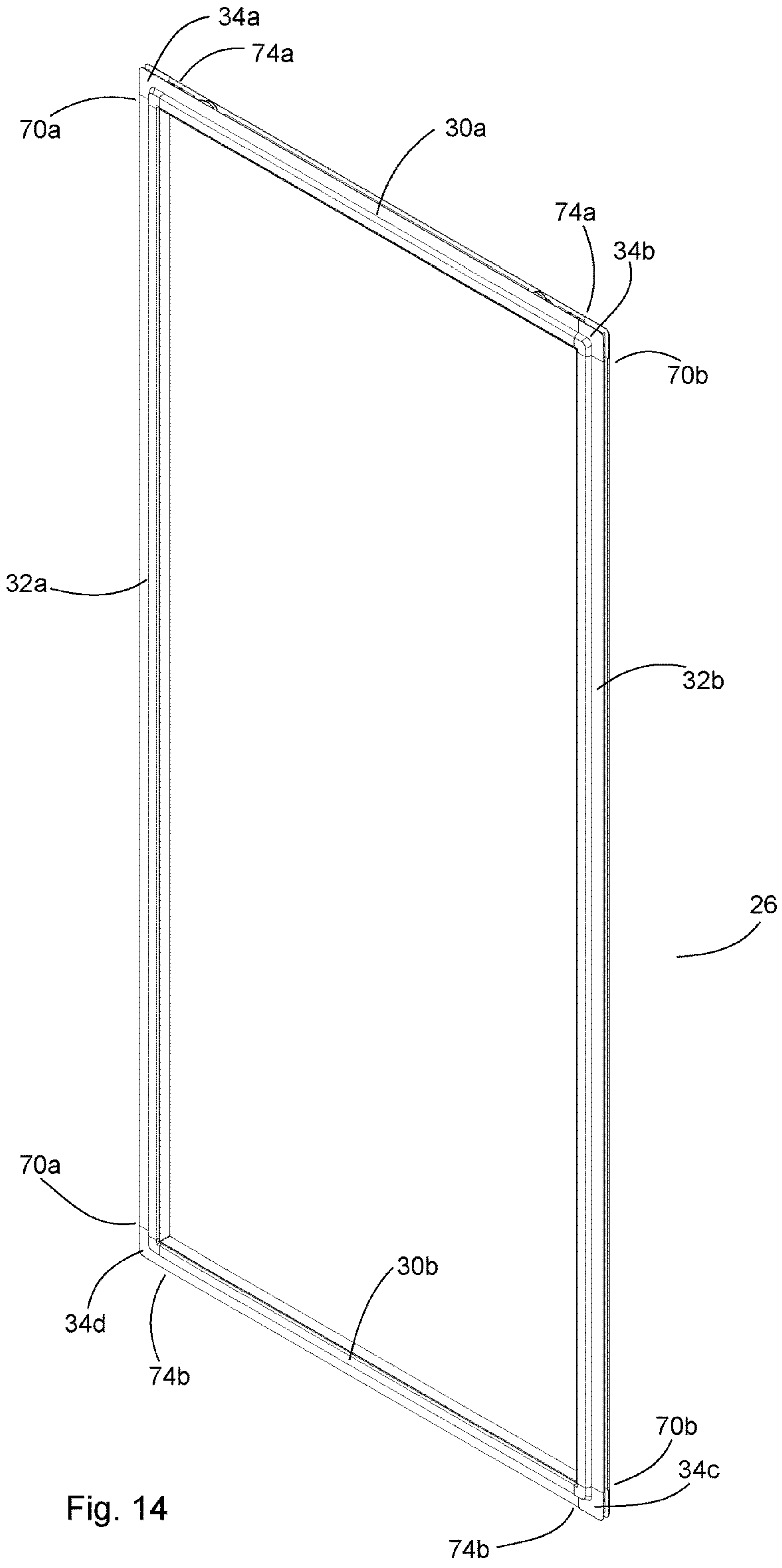
FIG. 14 shows an embodiment of the frame.
Figure 15:
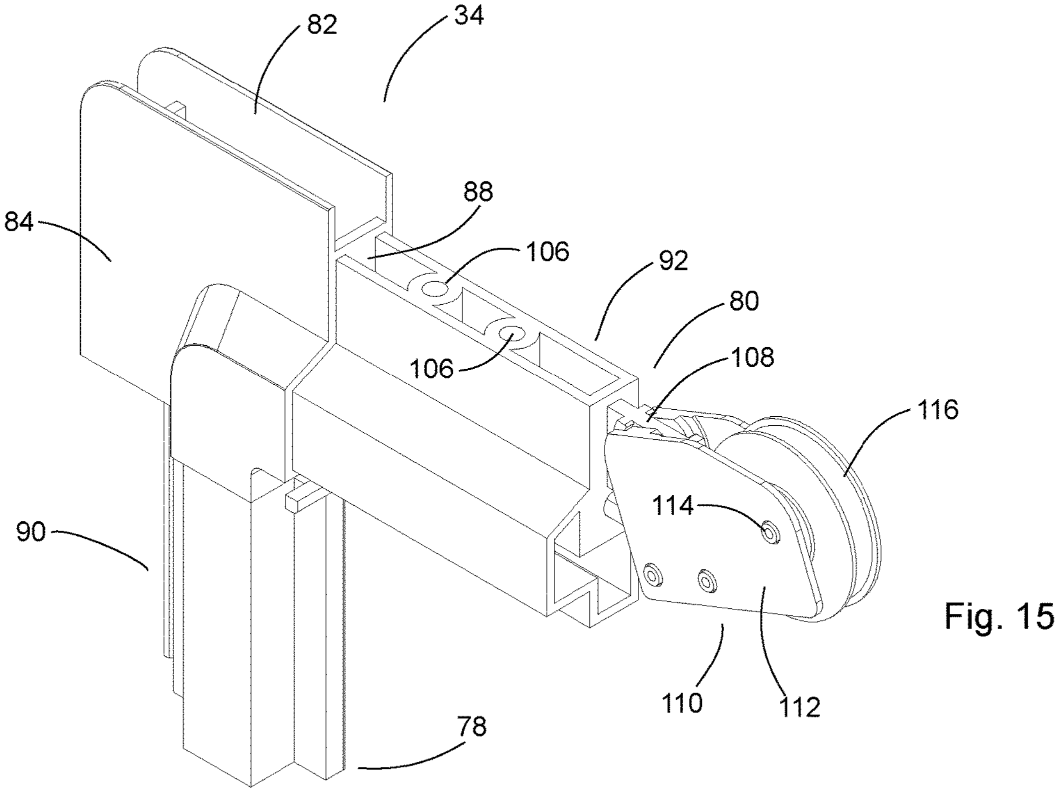
FIG. 15 shows a corner member of the screen door system of FIG. 1.
Figure 16:
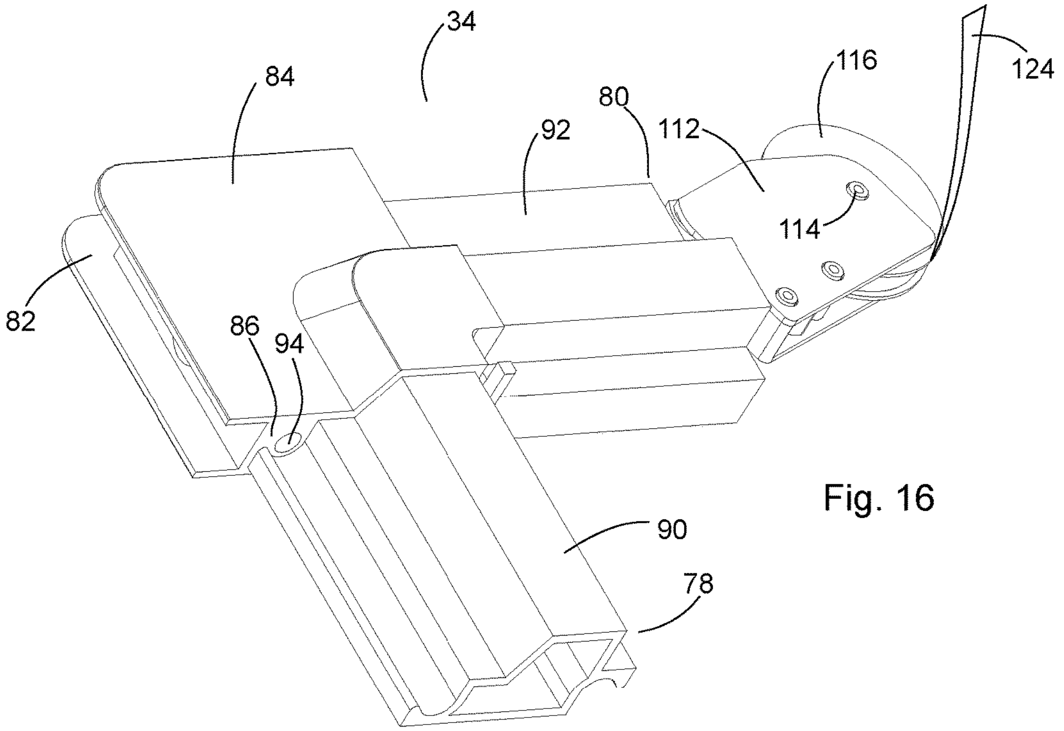
FIG. 16 shows the corner member of FIG. 15 from another angle.
Figure 17:
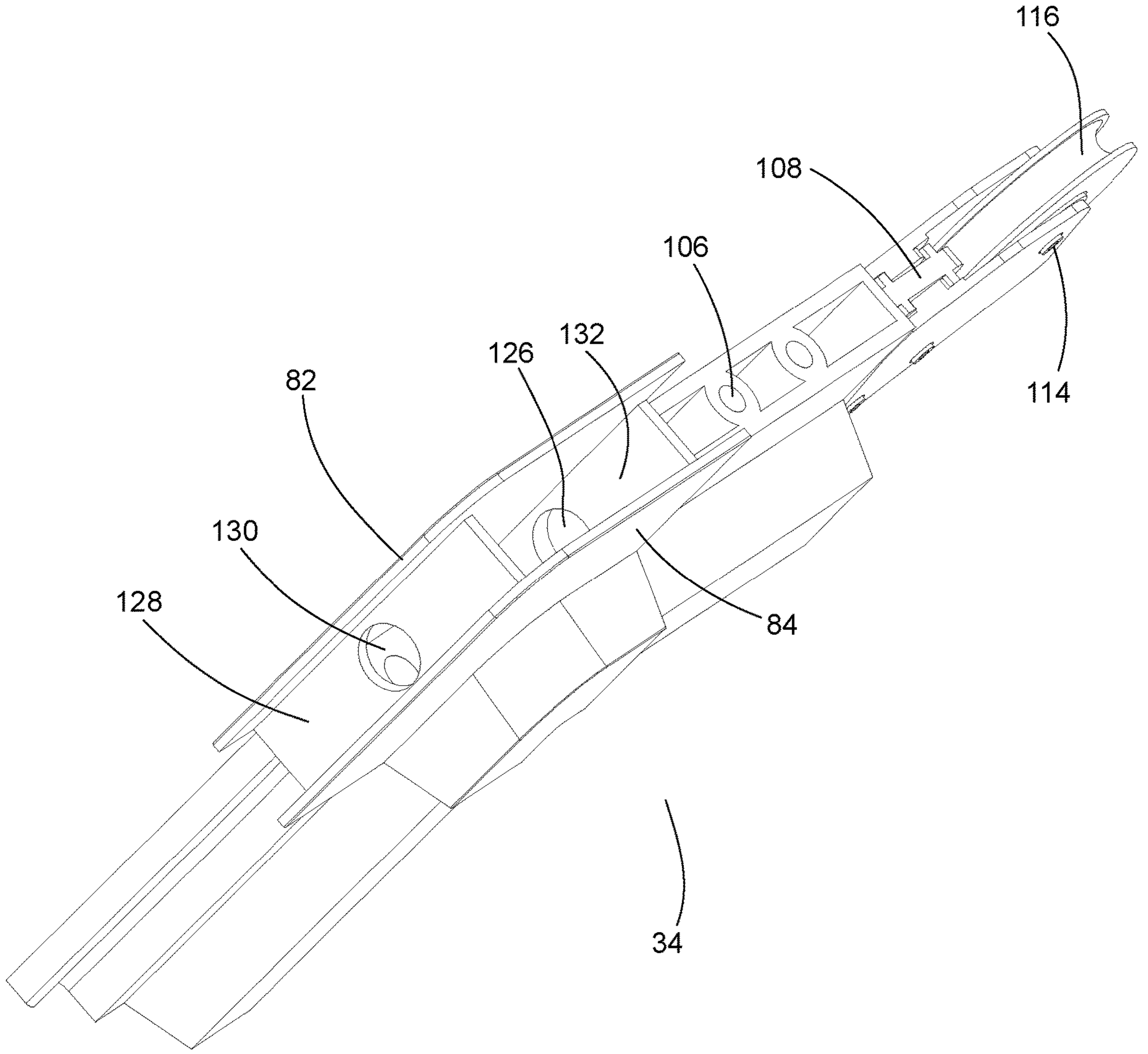
FIG. 17 shows the corner member of FIG. 15 from yet another angle
Figure 18:
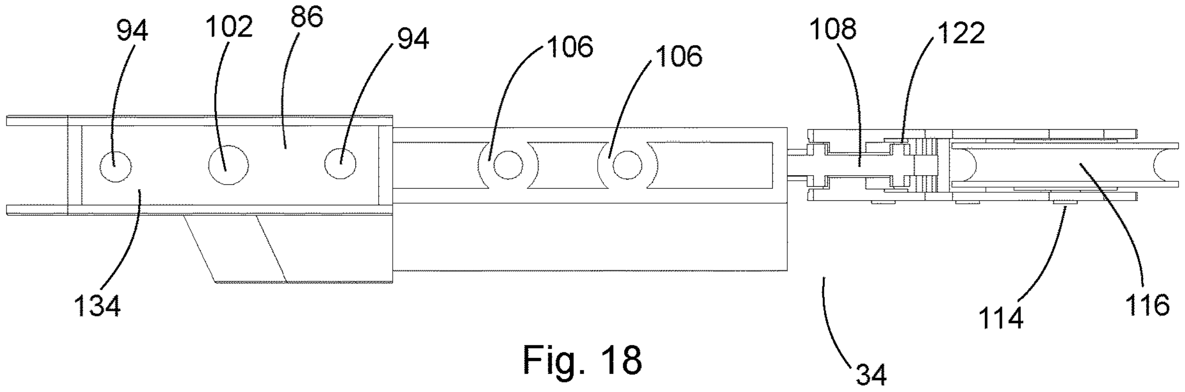
FIG. 18 is a top view of the corner member of FIG. 15.
Figure 19:
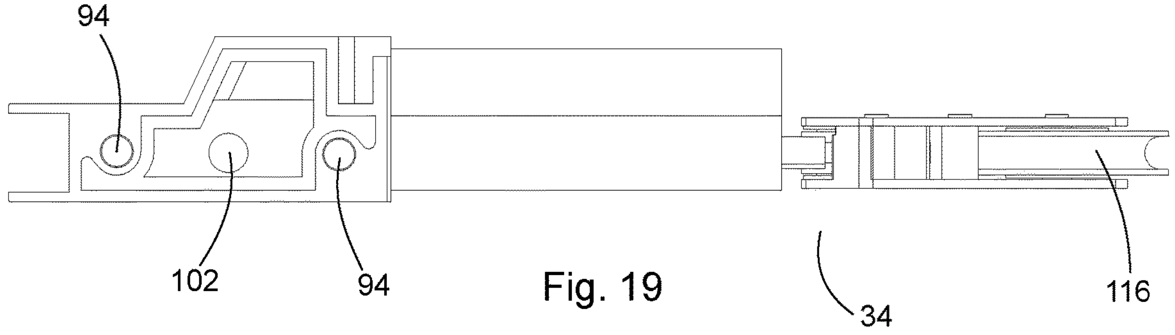
FIG. 19 is a bottom view of the corner member of FIG. 15.

For example, FIG. 14 shows one embodiment of the frame 26, with two horizontal members 30*a*, 30*b*, two vertical members 32*a*, 32*b*, and four corner members 34*a*, 34*b*, 34*c*, 34*d*. Corner member 34*a* connects horizontal member end 74*a* with vertical member end 70*a*, corner member 34*b* connects horizontal member end 74*a* with vertical member end 70*b*, corner member 34*c* connects horizontal member end 74*b* with vertical member end 70*b*, and corner member 34*d* connects horizontal member end 74*b* with vertical member end 70*a*.

Referring to FIGS. 15 to 21, which shows one of the corner members 34, the corner member 34 comprises a corner outer surface 82 and a corner inner surface 84. Corner first and second connectors 86, 88 extends between the corner outer surface 82 and corner inner surface 84. In the embodiment shown in FIGS. 15 to 21, the corner first and second connectors 86, 88 are substantially perpendicular to each other. A corner first protrusion 90 extends from the corner first connector 86 and is preferably adapted to slide within one of the vertical member ends 70. For example, the corner first protrusion 90 may be dimensioned such as to friction fit within the vertical cavity 72.

Alternatively, or additionally, the corner first connector 86 may comprise one or more corner first connector openings 94 adapted to receive fasteners 96. The fasteners 96 secure the corner member 34 to the vertical member 32. In order to receive the fasteners 96, one or more fastener chases 98 may be formed in the interior of the vertical cavity 72. The fastener chases 98 may comprise one or more flanges 100 extending from one or more of the vertical outer surface 36, the vertical inner surface 38, and the vertical connectors 44. The fastener chases 98 preferably extend for an entire height of the vertical member 32, but they extend for at least a portion of the vertical member 32 proximate to the vertical member ends 70. The fasteners 96 may be screws that are adapted to be screwed through the corner first connector openings 94 into the fastener chases 98, thereby securing the corner member 34 to the vertical member 32.

The corner first connector 86 may also comprise one or more drainage openings 102 that are adapted to allow for water and other liquids to pass through into the vertical cavity 72. This prevents water and other liquids from pooling or collecting within the corner member 34.

Referring to FIGS. 12 and 13, preferably, when the corner member 34 is connected to the vertical member 32, the corner outer surface 82 is flush and continuous with the vertical outer surface 36, and the corner inner surface 84 is flush and continuous with the vertical inner surface 38. This results in the corner member 34 and the vertical member 32 appearing to have a smooth transition between the two.

A corner second protrusion 92 extends from the corner second connector 88 and is preferably adapted to slide within one of the horizontal member ends 74. For example, the corner second protrusion 92 may be dimensioned such as to friction fit within the horizontal cavity 76.

Alternatively, or additionally, the horizontal first connector 60 may comprise one or more horizontal first connector openings 104 adapted to receive fasteners 96. The fasteners 96 secure the horizontal member 30 to the corner member 34. In order to receive the fasteners 96, one or more fastener receivers 106 may be formed in the corner second protrusion 92. The fasteners 96 may be screws that are adapted to be screwed through the horizontal first connector openings 104 into the fastener receivers 106, thereby securing the horizontal member 30 to the corner member 34.

Referring to FIGS. 15 to 21, the corner member 34 comprises a wheel guide 108 extending from the corner member second protrusion 92. The wheel guide 108 is pivotably connected to a wheel mechanism 110. The wheel mechanism 110 comprises a body 112 with an axle 114 extending therethrough. A wheel 116 is attached to the axle 114 and is able to rotate freely with respect to the body 112. The horizontal first connector 60 comprises a wheel opening 118 through which at least a portion of the wheel 116 passes. The portion of the wheel 116 that passes through the wheel opening 118 is dependent on the degree of pivoting of the wheel mechanism 110 with respect to the wheel guide 108. This degree of pivoting may be adjusted using an adjustment screw 120 that extends from the corner second protrusion 92.

For example, the body 112 comprises an attachment point 122 at which the body 112 is pivotably connected to the wheel guide 108. The adjustment screw 120 is adapted to variably extend from the corner second protrusion 92 and to engage the body 112 at a point distal from the attachment point 122. Therefore, when the adjustment screw 120 is completely within or flush with the corner second protrusion 92, the body 112 will be substantially in contact with the corner second end 80. This corresponds to a relatively small portion of the wheel 116 extending through the wheel opening 118.

Figure 20:
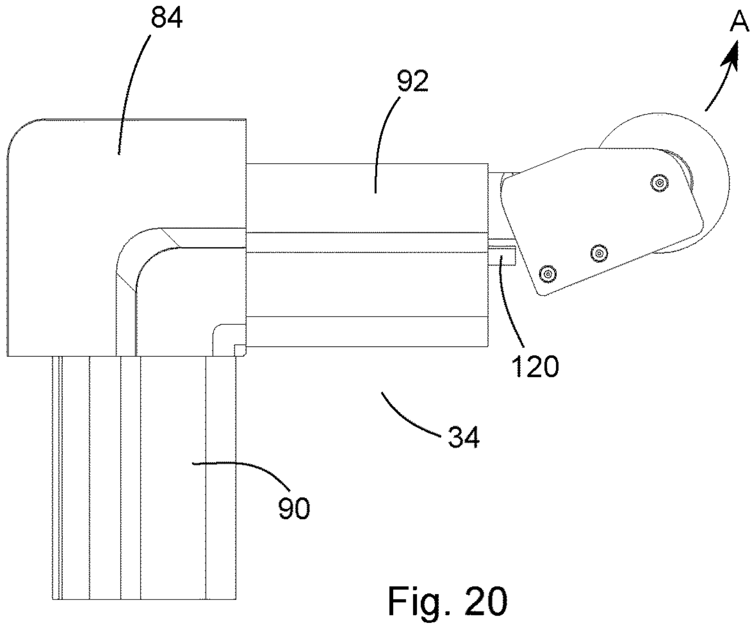
FIG. 20 is a front view of the corner member of FIG. 15.
Figure 21:
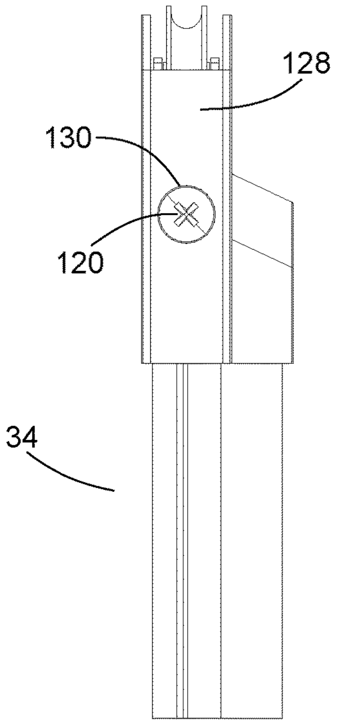
FIG. 21 is a side view of the corner member of FIG. 15.

As the adjustment screw 120 is adjusted to extend from corner second protrusion 92, the adjustment screw 120 will engage the body 112 and push the body 112 to pivot away from the corner second end 80. As the adjustment screw 120 extends from the corner second protrusion 92, the adjustment screw 120 will push the body 112 to pivot in direction A, as shown in FIG. 20. This corresponds to a relatively greater portion of the wheel 116 extending through the wheel opening 118. The further that the adjustment screw 120 extends from the corner second protrusion 92, the greater the portion of the wheel 116 extending through the wheel opening 118.

As the wheel 116 is adapted to travel within either one of the upper or lower tracks 14, 16, the adjustment screw 120 allows the portion of the wheel 116 extending through the wheel opening 118 and engaging with the upper or lower tracks 14, 16 to be adjusted, depending on the characteristics of the screen door 12 and the upper and lower tracks 14, 16.

A band 124 may also extend from the body 112 and engage with the horizontal first connector 60. The band 124 may be made from a metallic material and may be used to provide a tensioning force to provide some resistance against the action of the adjustment screw 120.

Referring to FIGS. 15 to 21, the adjustment screw 120 extends through the corner second connector 88 at a corner second connector opening 126. corner member 34 preferably also comprises a corner third connector 128 extending between the corner outer surface 82 and the corner inner surface 84. The corner third connector 128 is preferably substantially parallel and opposed to the corner second connector 88. For example, in the embodiment shown in FIGS. 15 to 19, the corner second connector 88 and the corner third connector 128 extend substantially perpendicularly from opposed ends of the corner first connector 86. The corner third connector 128 preferably comprises a corner third connector opening 130 that corresponds to the corner second connector opening 126. This allows a screwdriver or other similar implement to extend through the corner third connector opening 130 towards the corner second connector opening 126 in order to adjust the adjustment screw 120 through rotation.

Referring again to FIG. 15, the corner outer surface 82, the corner inner surface 82, the corner first connector 86, the corner second connector 88, and the corner third connector 128 generally define a corner cavity 132 with a corner opening 134 on one side. The corner opening 134 allows a screwdriver or other similar implement to extend through the corner opening 134 into the corner cavity 132 towards the corner first connector 86 in order to engage the fasteners 96 into the corner first connector openings 94.

Referring to FIGS. 12 and 13, preferably, when the corner member 34 is connected to the horizontal member 30, the corner outer surface 82 is flush and continuous with the horizontal outer surface 52, and the corner inner surface 84 is flush and continuous with the horizontal inner surface 54. This results in the corner member 34 and the horizontal member 30 appearing to have a smooth transition between the two.

One or more handles 140 may be located on one or both of the vertical outer surface 36 and the vertical inner surface 38 for one or both of the vertical members 32. The handles 140 allow for a user to grasp the screen door 12 and to slide the screen door 12 horizontally along the upper and lower tracks 14, 16. Furthermore, a rubber gasket 142 may be connected to one or both of the vertical members 32. The rubber gasket 142 may be attached to the vertical member 32 by insertion into at least a portion of the vertical channel 50.

Figure 22:
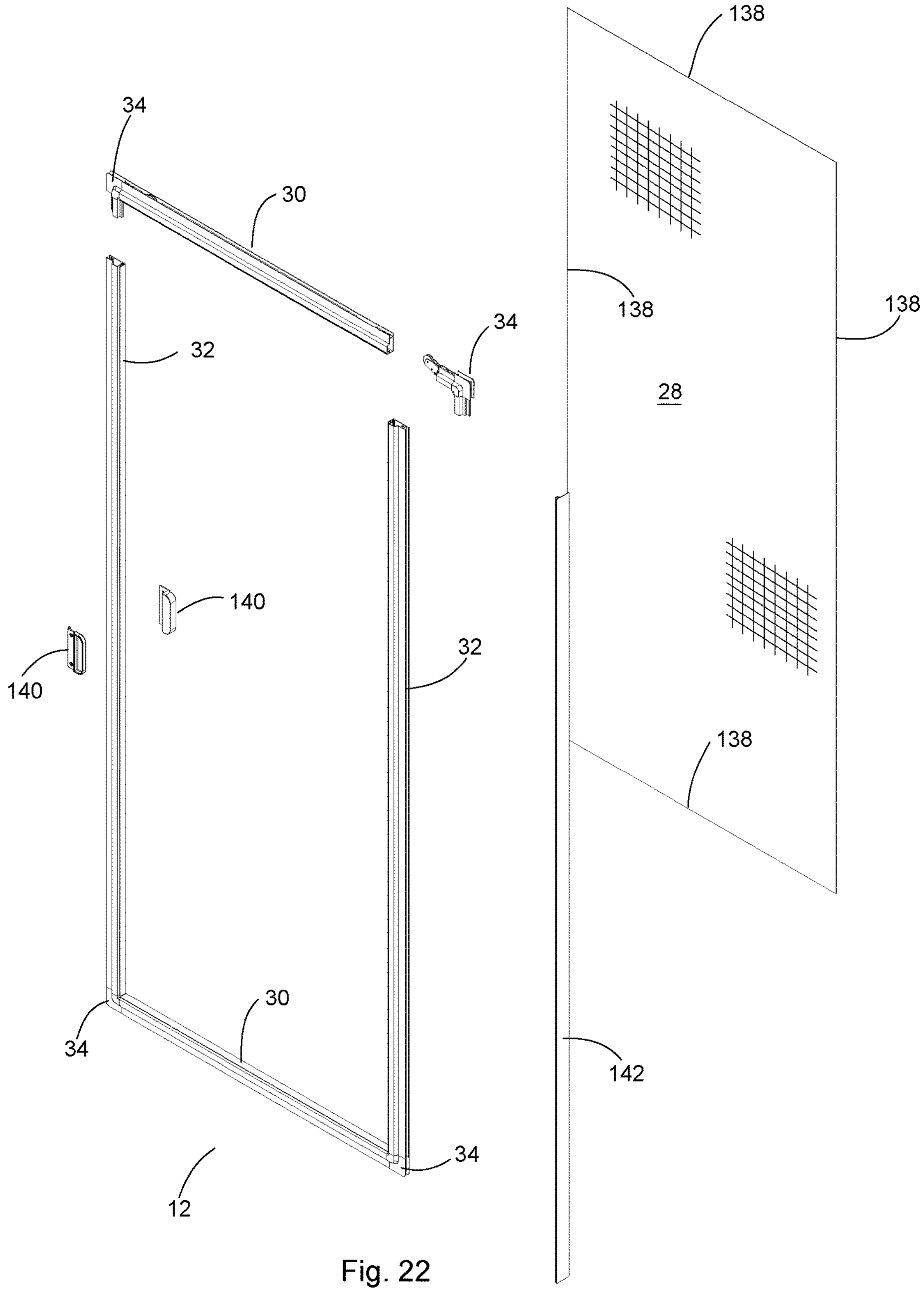
FIG. 22 is an exploded view of the screen door of FIG. 2.

The installation of the screen door system 10 will now be described. Referring to FIG. 22, the vertical members 32 are first cut to their desired sizes, based at least in part on the distance between the upper and lower tracks 14, 16. The horizontal members 30 may also be cut to their desired sizes. The corner members 34 are connected to both of the horizontal ends 74 of the two horizontal members 30 by inserting the corner second protrusions 92 into the horizontal cavities 76 proximate to the horizontal ends 74. The corner members 34 may be further secured to the horizontal members 30 by attaching fasteners 96 through the horizontal first connector openings 104 and the fastener receivers 106.

The corner members 34 are then connected to both of the vertical ends 70 of the two vertical members 32 by inserting the corner first protrusions 90 into the vertical cavities 72 proximate to the vertical ends 70. The corner members 34 may be further secured to the vertical members 32 by attaching fasteners 96 through the connector first connector openings 94 and the fastener chases 98. This will result in the frame 26 being formed.

The mesh 28 may then be attached to the frame 26. The frame 26 has an inner perimeter 136, with the vertical grooves 42 of the two vertical members 32 and the horizontal grooves 58 of the two horizontal members 30 proximate to the inner perimeter 136. The mesh 28 comprises external edges 138 and has dimensions that are slightly larger than the inner perimeter 136, preferably such the external edges 138 extend approximately 2 inches beyond the inner perimeter 136.

The mesh is placed on the frame 26 such that the external edges 138 extend over the vertical and horizontal grooves 42, 58. By using a spline roller or similar implement to push the mesh 28 into the vertical and horizontal grooves 42, 58, the mesh 28 may be attached to the frame 26, forming the screen door 12.

The screen door 12 may then be attached to the upper and lower tracks 14, 16 by placing the wheels 116 of the upper two of the corner members 34 on the upper track 14 and by placing the wheels 116 of the lower two of the corner members 34 on the lower track 16. Each of the wheels 116 may further be adjusted so that more or less of the wheel 116 extends through the horizontal first connector opening 104, depending on the particular adjustments required to ensure that the wheel 116 properly travels on the upper or lower track 14, 16.

One or more of the handles 140 may be attached to one or both of the vertical outer surface 36 and the vertical inner surface 38 for one or both of the vertical members 32.

It will be appreciated by those skilled in the art that the preferred embodiment has been described in some detail but that certain modifications may be practiced without departing from the principles of the invention.

The invention claimed is:

1. A screen door system, comprising:
upper and lower tracks;
two opposed vertical members, each of the vertical members comprising:
a vertical outer surface;
a vertical inner surface spaced apart from the vertical outer surface
one or more vertical connectors extending between the vertical outer surface and the vertical inner surface, wherein the vertical outer surface, the vertical inner surface, and the vertical connectors define a vertical cavity extending an entire height of the vertical members; and
one or more flanges extending from one or more of the vertical outer surface, the vertical inner surface, and the vertical connectors, wherein the one or more flanges define one or more fastener chases within the vertical cavity, and wherein the one or more fastener chases extend the entire height of the vertical members;
two opposed horizontal members, wherein each of the horizontal members comprises a plurality of wheel openings;
four corner members, wherein each of the corner members comprises:
opposed inner and outer surfaces;
first and second connectors extending between the inner and outer surfaces, the first and second connectors substantially perpendicular to each other, wherein the first connectors comprise one or more first connector openings, wherein the one or more first connector openings are adapted to receive fasteners therethrough for engagement with the one or more fastener chases;

a first protrusion extending from the first connector; the first protrusion being adapted to engage with one of the vertical members;

a second protrusion extending from the second connector, the second protrusion being adapted to engage with one of the horizontal members;

a wheel guide extending from the second protrusion;

a wheel mechanism pivotably connected to the wheel guide, the wheel mechanism comprising a wheel adapted to extend, at least partially, through one of the plurality of wheel openings to engage one of the upper and lower tracks;

an adjustment mechanism for pivoting the wheel mechanism with respect to the wheel guide to adjust an extent that the wheel extends through the one of the plurality of wheel openings; and a third connector extending between the inner and outer surfaces, wherein the inner surface, the outer surface, the first connector, the second connector, and the third connector define, at least in part, a corner cavity, and wherein the third connector comprises an opening that provides access through the corner cavity to the adjustment mechanism; and a mesh extending between the horizontal members and the vertical members.

2. The screen door system of claim 1, wherein the adjustment mechanism is a screw extending from the second protrusion and engaging with the wheel mechanism.

3. The screen door system of claim 2, wherein rotation of the screw pivots the wheel mechanism with respect to the wheel guide.

4. The screen door system of claim 1, wherein the third connector is substantially parallel to the second connector.

5. The screen door system of claim 1, wherein the vertical members comprise opposed hollow vertical ends.

6. The screen door system of claim 5, wherein the first protrusion is adapted to be inserted within one of the vertical ends.

7. The screen door system of claim 1, wherein the corner cavity defines a corner opening, the corner opening providing access through the corner cavity to the one or more first connector openings.

8. The screen door system of claim 1, wherein the first connector comprises one or more drainage openings, the drainage openings adapted to allow liquid to exit the corner cavity.

9. The screen door system of claim 1, wherein the horizontal members comprise opposed hollow horizontal ends, and wherein the second protrusion is adapted to be inserted within one of the horizontal ends.

10. The screen door system of claim 1, wherein the vertical outer surface is planar.

11. The screen door system of claim 10, wherein the vertical inner surface comprises a vertical projection extending away from the vertical outer surface.

12. The screen door system of claim 1, wherein each of the vertical members further comprises a vertical channel extending along the entire height of the vertical members, the vertical channel defined by portions of the vertical outer surface, the vertical inner surface, and one of the vertical connectors.

13. The screen door system of claim 1, wherein each of the horizontal members further comprises:

a horizontal outer surface;

a horizontal inner surface spaced apart from the horizontal outer surface; and two horizontal connectors extending between the horizontal outer surface and the horizontal inner surface, wherein the horizontal outer surface, the horizontal inner surface, and the two horizontal connectors define a horizontal cavity extending an entire length of the horizontal members.

14. The screen door system of claim 13, wherein the horizontal outer surface is planar.

15. The screen door system of claim 14, wherein the horizontal inner surface comprises a horizontal projection extending away from the horizontal outer surface.

16. The screen door system of claim 13, wherein one of the horizontal connectors comprises one or more horizontal connector openings, wherein the second protrusion comprises one or more fastener receivers, and wherein the one or more horizontal connector openings and the one or more fastener receivers are adapted to receive fasteners therethrough for securing the horizontal members to the corner members.

* * * * *